United States Patent [19]

Kiyokuni et al.

[11] 4,172,270
[45] Oct. 23, 1979

[54] COMPRESSED GAS FILLED CIRCUIT BREAKER

[75] Inventors: Nobuaki Kiyokuni; Tadashi Morita, both of Kawasaki, Japan

[73] Assignee: Fuji Electric Co., Ltd., Kawasaki, Japan

[21] Appl. No.: 808,497

[22] Filed: Jun. 21, 1977

[30] Foreign Application Priority Data

Jun. 26, 1976 [JP] Japan .................................. 51-74994

[51] Int. Cl.² ............................................. H02H 3/00
[52] U.S. Cl. .................................... 361/115; 361/156; 200/148 D
[58] Field of Search .............. 361/115, 335, 332, 376, 361/156; 200/145, 148 D, 148 B, 144 B; 307/143; 340/195, 416; 336/182, 220, 221, 170

[56] References Cited

U.S. PATENT DOCUMENTS

| | | | |
|---|---|---|---|
| 3,287,680 | 11/1966 | Houpt | 336/170 X |
| 3,532,843 | 10/1970 | Pucher | 200/148 D |
| 3,780,349 | 12/1973 | Nitta et al. | 361/115 |
| 4,032,988 | 6/1977 | Kiyokuni | 361/115 |

Primary Examiner—Patrick R. Salce
Attorney, Agent, or Firm—Sughrue, Rothwell, Mion, Zinn and Macpeak

[57] ABSTRACT

An electrical circuit breaker comprising a pair of switches 40 connected in series in a power line L, a pair of drive coils 42 disposed adjacent the switches for electromagnetically repelling them when energized, and a remotely positioned transformer 44, 46 for energizing the coils, all disposed within grounded main and auxilliary tanks 38, 48 filled with a compressed, arc-suppressing gas. The primary winding of the transformer is energized by a storage capacitor 52 discharging through a spark gap 50 arced by a synchronous detector 62 and a pulse converter 58 in response to a line overage sensed by a coil 64 or an external control signal, and these latter components are disposed outside of the high voltage tanks.

9 Claims, 5 Drawing Figures

COMPRESSED GAS FILLED CIRCUIT BREAKER

BACKGROUND OF THE INVENTION

The present invention relates to a compressed gas filled circuit breaker of the electromagnetic repulsion type in which a capacitor discharge current flowing through drive coils exerts an electromagnetic repulsive force on movable switch contacts to break the circuit.

The conventional circuit breaker of this type employs an insulator construction, and the energy stored in the capacitor for driving the contacts must be supplied through an insulating transformer from the energy source on the ground side of the breaker system. Also, the control signal for discharging the capacitor is transmitted by a photoelectric signal from the ground side to the high voltage side.

It is well known that insulating transformers are expensive, and this disadvantage as well as the large size thereof becomes more severe when the rated voltage is high because the number of connections is correspondingly increased. Further, the photo-electric system through which the control instruction is transmitted and converted is also expensive.

Recently, a circuit breaker employing a tank type of structure has been proposed. Such devices have anti-shock properties and high durability due to the use of $SF_6$ gas or the like which causes rapid arc extinction.

It has been attempted to combine the former system, using an insulating transformer, with such a tank type of gas filled circuit breaker in order to obtain the advantages of the latter. However, the incorporation of an insulating transformer in the tank type gas filled circuit breaker has been difficult. It is very difficult to transmit energy to the high potential side because the insulating transformer is much larger than the tank. Also, since the portion for controlling the discharge of the capacitor is positioned in the high potential side and hence inside the tank, the maintenance thereof is difficult. On the other hand, should the energy be derived from the tank, high voltage bushings are required.

SUMMARY OF THE INVENTION

It has been found that the above drawbacks and disadvantages can be eliminated by:

(1) Disposing the capacitor and its charging and discharge control circuits on the ground side of the breaker outside of the tank, (2) Disposing an air core or iron core transformer, instead of an insulating transformer, in an auxilliary tank, (3) Transmitting the energy stored in the capacitor to the switch drive coils of the breaker through the transformer, and (4) Disposing the transformer at a position remote or spaced from the power line to prevent erroneous operation due to induced currents.

The present invention implements these features by providing an electrical circuit breaker comprising a pair of switches connected in series in a power line, a pair of drive coils disposed adjacent the switches for electromagnetically repelling them when energized, and a remotely positioned transformer for energizing the coils, all disposed within grounded main and auxilliary tanks filled with a compressed, arc-suppressing gas. The primary winding of the transformer is energized by a storage capacitor discharging through a spark gap arced by a synchronous detector and a pulse converter in response to a line overage sensed by a coil or an external control signal, and these latter components are disposed outside of the high voltage tanks.

DETAILED DESCRIPTION OF THE PREFERRED EMBODIMENTS

Figure 1:
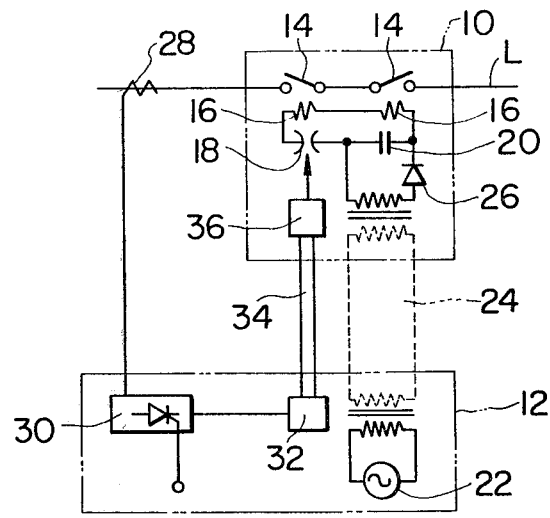
FIG. 1 shows a schematic diagram of a conventional circuit breaker.

Referring now to the drawings, FIG. 1 schematically shows the construction of a conventional insulator type of synchronous circuit breaker comprising a high voltage circuit breaking chamber 10 and a support table 12 which may be grounded. The chamber 10 may be fixedly mounted to the table 12 by means of an insulator, not shown. The breaker chamber 10 houses a pair of switches 14 connected in series in the circuit line L, and drive coils 6 which are disposed adjacent and electromagnetically coupled to the switches 14, respectively. The drive coils 15 are connected through a spark gap 18 to a capacitor 20 adapted to store energy for driving the coils 16 and the switches 14. The capacitor 20 is charged through a rectifier 26 and an insulating transformer 24 from a source 22 disposed on the ground side of the circuit breaker.

In operation, a current on line L is sensed by coil 28, which acts as a transformer secondary, converted to an electrical pulse by synchronous detector 30, subsequently converted to an optical pulse by light emitter 32, and transmitted via optical guide means 34 to a light receiver 36 where the pulse is reconverted into an electrical signal for arcing or initiating the spark gap 18. As shown in FIG. 1, the synchronous detector 30 and the light emitter 32 are disposed on the ground side, and the light receiver 36 is disposed on the high potential side. The optical guide means 34 is housed together with the insulating transformer 24 in a supporting insulator, not shown. Both are necessary to provide functional interconnection while at the same time electrically insulating the ground and high voltage sides of the breaker.

When an arc is initiated across the spark gap the capacitor 20 rapidly discharges through the drive coils 16, whereby the switches 14 are opened due to the electromagnetic repulsion force generated.

In the construction of such a conventional circuit breaker the cost of the insulating transformer and the photoelectric conversion device is quite high, and the presence of the insulating transformer makes it impossible to obtain the advantage of a tank type circuit breaker.

FIGS. 2, 3, 4 and 5 each show schematic diagrams of tank type compressed gas filled circuit breakers according to different embodiments of the present invention.

Figure 2:
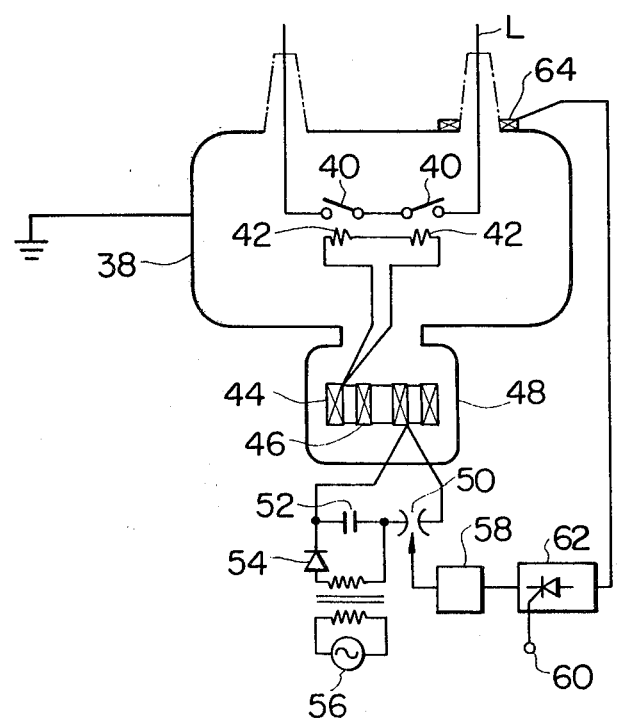
FIG. 2 shows a schematic diagram of a circuit breaker according to an embodiment of the present invention.

Referring now to FIG. 2, a pair of switches 40 connected in series in a circuit line L are disposed in a grounded main tank 38, and a pair of drive coils 42 are disposed adjacent to the switches 40, as in FIG. 1. A low potential transformer primary coil 46 and a secondary coil 44 are disposed in an auxilliary tank 48. The primary coil is electromagnetically coupled to the secondary coil and connected to the current supply source side of the breaker, and the secondary coil is connected in series with the drive coils 42. To provide adequate insulation between the primary and secondary coils, compressed gas, solid, or liquid material may be used. The energy system for charging the capacitor 52 from the power source 56 through a rectifier 54, for discharging the capacitor through the spark gap 50, and for arcing the gap is response to the sensing output of coil 64 as processed by the synchronous detection device 62, is the same as that disclosed in U.S. patent application Ser. No. 653,866 filed Jan. 30, 1976, now U.S. Pat. No. 4,032,988. Further, the spark gap 50, capacitor 52, and rectifier are disposed outside of the main and auxilliary tanks on the ground side of the circuit breaker.

In operation, the capacitor 52 is first charged from the power source 56 through the rectifier 54. When an auxilliary or outside breaking instruction is applied to terminal 60, or when the coil 64 senses an overage, a pulse signal is produced by the synchronous detection device 62 and supplied to the pulse converter 58. This pulse signal is amplified by the pulse converter 58 and arcs or initiates the spark gap, whereby the energy stored in the capacitor 52 is discharged through the primary coil 46 electromagnetically coupled to the secondary coil 44. Current thus flows through the drive coils 42, to thereby open the switches 40 by electromagnetic repulsion.

Figure 3:
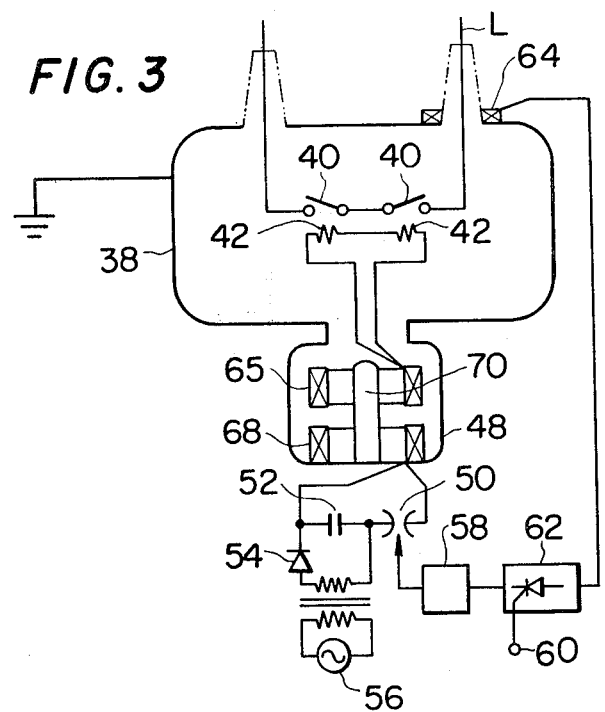
FIGS. 3, 4 and 5 show schematic diagrams of further embodiments of the invention.

FIG. 3 shows another embodiment of the invention wherein the auxilliary tank 48 further includes an iron core 70 for increasing the electromagnetic coupling between the primary coil 68 and the secondary coil 66 axially disposed thereon. The other components and their operation are identical with those of the FIG. 2 embodiment.

Figure 4:
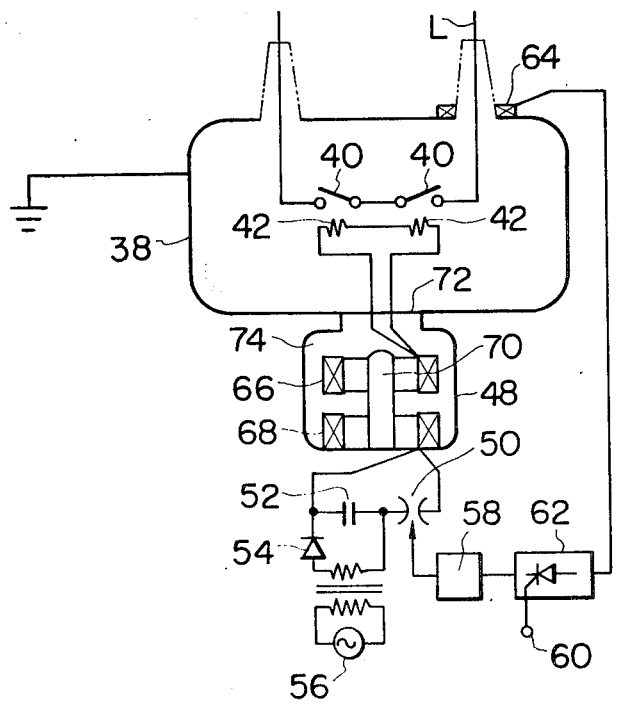
Figure 5:
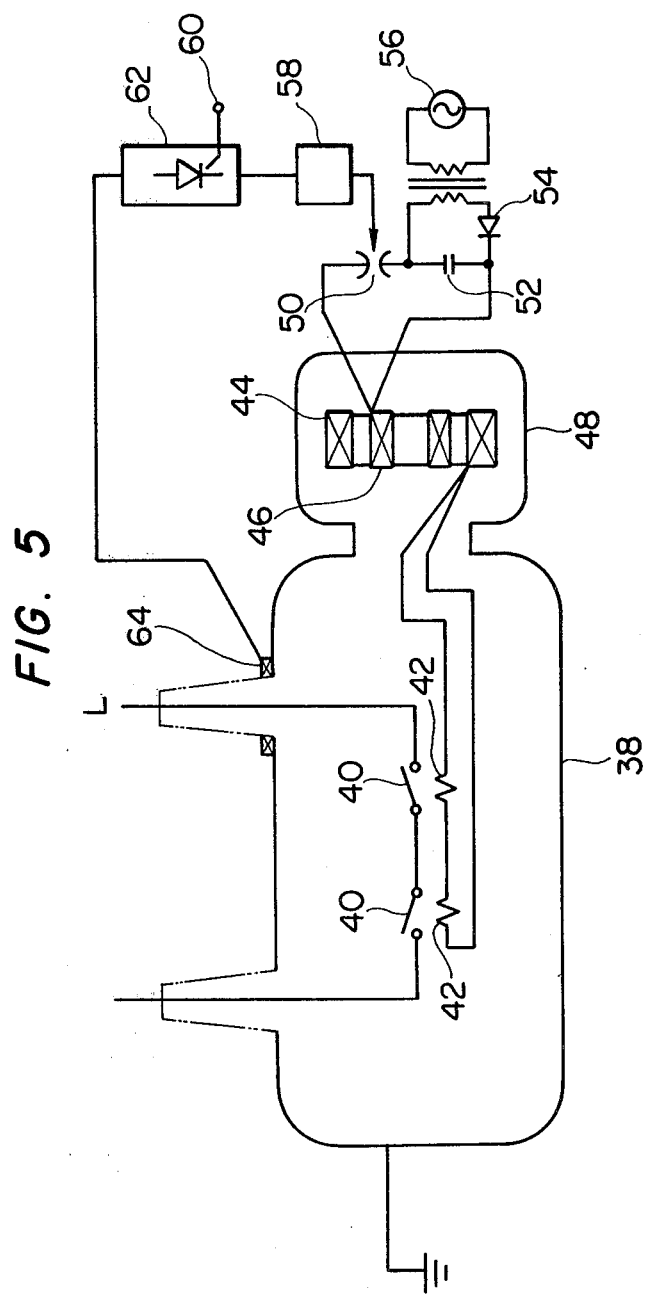

FIG. 4 shows still another embodiment of the invention wherein the main tank 38 and auxilliary tank 48 are separated by a partition 72. In this embodiment the electrical insulating agent used in the main tank may be different from the insulating agent 74 used in the auxilliary tank. For example, with the use of a solid insulator or SF$_6$ gas the dimensions of the auxilliary tank 48 may be made quite small.

As will be clear from the foregoing, the circuit breaker of the present invention uses only a small sized transformer instead of a relatively large and costly insulating transformer, and the drive coil storage capacitor is disposed outside of the tanks and on the ground potential side whereby its maintenance is greatly facilitated. The size and cost of the device is further reduced by eliminating the photoelectric conversion device in the breaking instruction system, and since the primary and secondary coils are mounted in the auxilliary tank remote from the circuit line L, erroneous operation due to induced currents is avoided. Such isolation also enables the auxilliary tank to be mounted at a more arbitrary location according to design and space requirements, as shown by the side mounting arrangement in FIG. 5, for example. As is also obvious, the number of switches 40 is not limited to two as shown, but one or three or more may be used. Two is the more usual number to provide an adequate safety margin at an acceptable cost level.

What is claimed is:

1. In an electrical circuit breaker including grounded tank means filled with an arc-suppressant, at least one gerrous switch disposed in the tank means and connected in series in a power line passing through the tank means, at least one drive coil disposed in the tank means adjacent the switch for electromagnetically opening said switch when energized, a transformer disposed in the tank means and including a primary winding and a secondary winding connected in series with the drive coil, and a storage capacitor and a charging and discharge control circuit therefore disposed outside the tank means, the capacitor being connected in series with the transformer primary winding, the improvements characterized by:
   (a) the grounded tank means comprising a main tank and an auxilliary tank,
   (b) the switch, power line, and drive coil being disposed in the main tank, and
   (c) the transformer being disposed in the auxilliary tank remote from the power line.

2. A circuit breaker as defined in claim 1, wherein the main tank is integrally formed with the auxilliary tank.

3. A circuit breaker as defined in claim 1, wherein the main tank is independent of the auxilliary tank.

4. A circuit breaker as defined in claim 1, wherein the transformer primary and secondary windings are cylindrical and concentrically arranged.

5. A circuit breaker as defined in claim 1, wherein the transformer primary and secondary windings are coaxially arranged and have substantially identical diameters.

6. A circuit breaker as defined in claim 3, wherein the arc-suppressant in the main tank is different from that in the auxilliary tank.

7. A circuit breaker as defined in claim 1, wherein the transformer has an air core.

8. A circuit breaker as defined in claim 1, wherein the transformer has an iron core.

9. A circuit breaker as defined in claim 3, wherein the main and auxilliary tanks are separated by a partition plate.